(12) United States Patent
Kang et al.

(10) Patent No.: US 9,391,672 B2
(45) Date of Patent: Jul. 12, 2016

(54) SYSTEM, MOBILE COMMUNICATION TERMINAL AND METHOD FOR TRANSFERRING INFORMATION

(75) Inventors: Moon-Soon Kang, Seongnam-si (KR); Jang-Hyuk Park, Seoul (KR)

(73) Assignee: KT Corporation, Seongnam-Si (KR)

( * ) Notice: Subject to any disclaimer, the term of this patent is extended or adjusted under 35 U.S.C. 154(b) by 91 days.

(21) Appl. No.: 13/589,438

(22) Filed: Aug. 20, 2012

(65) Prior Publication Data

US 2013/0045682 A1 Feb. 21, 2013

(30) Foreign Application Priority Data

Aug. 18, 2011 (KR) .................. 10-2011-0082447

(51) Int. Cl.
| | |
|---|---|
| H04W 4/00 | (2009.01) |
| H04B 5/00 | (2006.01) |
| H04W 4/02 | (2009.01) |
| H04W 92/18 | (2009.01) |
| G06Q 10/10 | (2012.01) |
| G06Q 30/06 | (2012.01) |
| H04M 1/725 | (2006.01) |

(52) U.S. Cl.
CPC .............. *H04B 5/0031* (2013.01); *G06Q 10/10* (2013.01); *G06Q 30/06* (2013.01); *H04B 5/0056* (2013.01); *H04M 1/7253* (2013.01); *H04W 4/008* (2013.01); *H04W 4/023* (2013.01); *H04W 92/18* (2013.01); *H04M 2250/04* (2013.01); *H04M 2250/12* (2013.01)

(58) Field of Classification Search
CPC ..... H04W 84/18; H04W 88/06; H04W 76/02; H04W 4/008; H04W 4/021–4/028; H04M 1/7253; H04M 2250/02
See application file for complete search history.

(56) References Cited

U.S. PATENT DOCUMENTS

| | | | | |
|---|---|---|---|---|
| 2010/0167646 | A1* | 7/2010 | Alameh et al. | ................ 455/41.2 |
| 2011/0185607 | A1* | 8/2011 | Forster et al. | ................... 40/452 |
| 2011/0258689 | A1* | 10/2011 | Cohen et al. | ....................... 726/7 |
| 2012/0220221 | A1* | 8/2012 | Moosavi et al. | ............. 455/41.1 |

FOREIGN PATENT DOCUMENTS

| | | |
|---|---|---|
| JP | 02-181190 A | 7/1990 |
| KR | 792340 B1 | 12/2007 |

OTHER PUBLICATIONS

Abstract of Korean Office Action; Application No. 2011-0082447; Dec. 22, 2014.

* cited by examiner

*Primary Examiner* — Lewis West
*Assistant Examiner* — Dong-Chang Shiue
(74) *Attorney, Agent, or Firm* — Sughrue Mion, PLLC

(57) ABSTRACT

A system, a mobile communication terminal, and a method for transferring information. The system for transferring information includes a first terminal configured to extract and transmit transfer information and a second terminal configured to receive the transfer information. Here, the transfer information corresponds to an intersection state between the first terminal and the second terminal when the first terminal performs first short-range communication with the second terminal, and the first terminal and the second terminal compute their respective position information when the first short-range communication is performed, exchange the position information with each other, and calculate the intersection state information based on the respective position information of the first and second terminals.

22 Claims, 5 Drawing Sheets

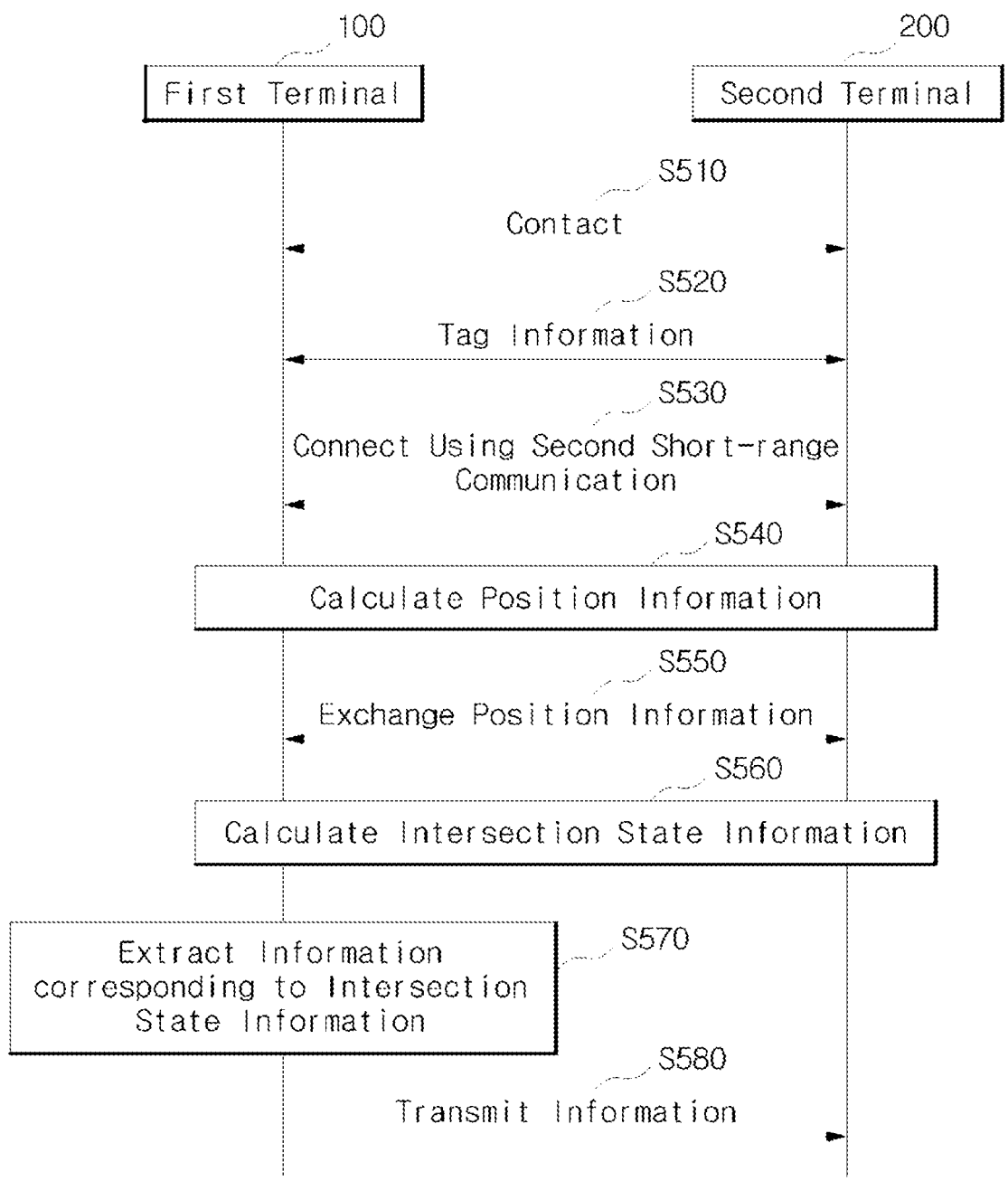

SYSTEM, MOBILE COMMUNICATION TERMINAL AND METHOD FOR TRANSFERRING INFORMATION

CROSS-REFERENCE TO RELATED APPLICATIONS

This application claims the benefit of priority from Korean Patent Application No. 10-2011-0082447, filed with the Korean Intellectual Property Office on Aug. 18, 2011, the disclosure of which is incorporated herein by reference in its entirety.

BACKGROUND

1. Technical Field

Exemplary embodiments broadly relate to short-range communication, and more specifically, to a system, a method and a mobile communication terminal for transferring information using short-range communication.

2. Background Art

In a related art, a system and a method for recognizing external information through a short-range reader attached to a mobile communication terminal is provided as described in Korean Patent Number 792340 B1 (Date of Patent: Dec. 31, 2007). This related art describes obtaining relevant information by selectively and automatically storing and running advertisement information and utilization information about a certain object using a short-range tag and a short-range reader.

SUMMARY

There is provided transferring information that is identified based on intersection state information when tagging occurs between mobile communication terminals having a short-range communication function.

According to an aspect of an exemplary embodiment, there is provided a system for transferring information between terminals.

According to an aspect of an exemplary embodiment, the system for transferring information can include: a first terminal configured to extract transfer information and configured to transmit it; and a second terminal configured to receive the transfer information. Here, the transfer information is extracted by the first terminal based on an intersection state between the first terminal and the second terminal when the first terminal communicates with the second terminal using first short-range communication, and the first terminal and the second terminal calculate their respective position information when the first short-range communication is performed, exchange the calculated position information with each other, and calculate the intersection state based on the respective position information of the first and second terminals.

According to yet another aspect of an exemplary embodiment, a mobile communication terminal that is configured to transmit transfer information to another terminal using short-range communication is provided.

According to yet another aspect of an exemplary embodiment, the mobile communication terminal can include: a first short-range communication unit configured to transmit and receive tag information to and from said another terminal; a sensor configured to detect position information of the mobile communication terminal when the tag information is transmitted and received; a memory configured to map and store the transfer information that corresponds to an intersection state of the mobile communication terminal with said another terminal; and a controller configured to exchange position information of said another terminal and the detected position information of the mobile communication terminal with said another terminal using the first short-range communication unit, configured to calculate the intersection state based on the position information of said another terminal and the detected position information, and configured to extract from the memory, the transfer information corresponding to the intersection state and configured to transmit the transfer information to said another terminal.

According to another aspect of an exemplary embodiment, a method for transferring information between terminals using short-range communication is provided.

According to another aspect of an exemplary embodiment, the method includes: connecting a first terminal with a second terminal using first short-range communication, and transmitting, by the first terminal, tag information to the second terminal; calculating, by the first terminal and the second terminal respective position information; exchanging with each other the calculated position information; calculating, by the first terminal, intersection state based on the position information of the first terminal and the position information of the second terminal; and extracting, by the first terminal, transfer information based on the intersection state, and transmitting, by the first terminal, the extracted transfer information to the second terminal.

BRIEF DESCRIPTION OF THE DRAWINGS

FIG. 5 is a flow diagram illustrating a method of transferring information according to an exemplary embodiment.

DETAILED DESCRIPTION OF EXEMPLARY EMBODIMENTS

Figure 1:
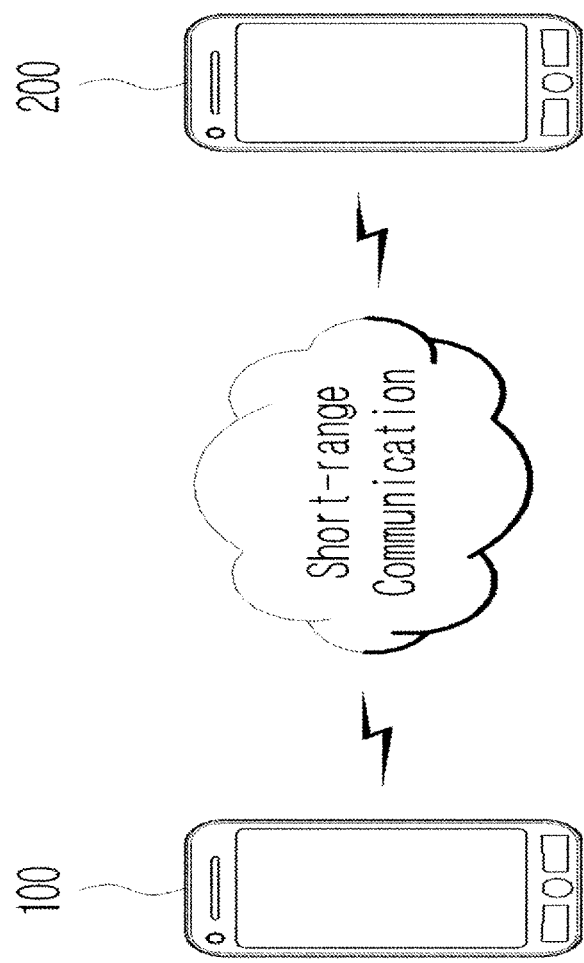
FIG. 1 is a view illustrating a configuration of a system for transferring information according to an exemplary embodiment.

Since there can be a variety of modifications, changes, and embodiments, certain exemplary embodiments will be illustrated and described with reference to the accompanying drawings. This, however, is by no means to restrict an inventive concept to certain embodiments, and shall be construed as including all modifications, changes, equivalents, and substitutes covered by the ideas and scope of an inventive concept as will be apparent to one of ordinary skill in the art. The following detailed description is provided to assist the reader in gaining a comprehensive understanding of the methods, apparatuses, and/or systems described herein.

Throughout the description, when describing a certain technology is determined to evade the point of an exemplary embodiment, the pertinent detailed description will be omitted. Numerals and terms (e.g., first, second, etc.) used in the description of various exemplary embodiments are only for distinguishing one element from another element.

When one element is described as being "connected" or having "access" to another element, it shall be construed as being connected or having access to the other element directly but also as possibly having another element in between, unless disclosed otherwise.

Hereinafter, exemplary embodiments will be described in detail with reference to the accompanying drawings. Identical or analogous elements will be given the same reference numerals, regardless of the figure number, and any redundant description of the identical or corresponding elements will not be repeated.

FIG. 1 is a view illustrating a configuration of a system for transferring information according to an exemplary embodiment.

Referring to FIG. 1, the system for transferring information includes a first terminal 100 and a second terminal 200. The first terminal 100 and the second terminal 200 are mobile communication terminal having short-range communication modules installed therein and can communicate with each other using the short-range communication modules.

Moreover, each of the terminals 100, 200 carries out a function of transferring information that is identified according to an intersection state when the terminals 100, 200 recognize each other's tags using short-range communication.

The short-range communication can include near field communication (NFC) or any of equivalently-functioning Bluetooth communication, ZigBee, RFID (Radio Frequency Identification) and infrared communication. The following exemplary Table 1 shows the specifications of the short-range communication technology.

TABLE 1

|  | Frequency Band | Range | Speed | Setup Time | Security | Application |
|---|---|---|---|---|---|---|
| NFC | 13.56 MHz | 0.3 m+ | 400 Kbps+ | 0.1 s | High (Hardware Level) | Payment, RFID |
| Bluetooth | 2.4 GHz | 1~100 m | 1~3 Mbps | 6 s | Middle (Software Level) | Data Exchange |
| ZigBee | Around 2.4 GHz | ~100 m+ | 20~250 Kbps | Always | Low | Device Control |

The NFC is expanded from the ISO/IEC 14443 proximity-card standard (contactless card or RFID) and can support a smartcard and a reader at the same time.

Moreover, since the NFC is expanded from the ISO/IEEE 14443 standard, the NFC can communicate with a conventional ISO/IEEE 14443 reader or a smartcard as well as an NFC device. The NFC is basically developed for use in mobile communication terminals.

Currently, the NFC is mainly used in the mobile communication terminals and can be operated in three modes of a card emulation mode, a read/write mode and an inter-terminal (P2P) communication mode.

In the card emulation mode, the NFC device operates like a RFID card such as the ones known in the art. Accordingly, a mobile terminal, instead of the RFID card, may approach an RFID reader. Currently, the specifications of the contactless smartcard have the frequency of 13.56 MHz, the communication distance of 10 cm or less and the communication speed of 106 kbs or higher. The contactless smartcard can be applied for payment or in the fare card industry. If the communication distance for the NFC device can be increased, applications of these devices may also be increased. For example, an NFC device that is configured to be detected from a further distance can be applied to a check-out system in a library, a theft-protection system, etc.

The read/write mode is a mode in which the NFC device works as a card reader. The NFC device can read information of another NFC device or a smart card.

The inter-terminal communication mode is a mode in which two NFC devices are engaged in a P2P (peer-to-peer) communication with each other. In the inter-terminal communication mode, a maximum data communication rate between the NFC devices is 424 kbps. Picture data can be transmitted by moving the mobile communication terminal towards a printer or can be displayed by moving the mobile communication terminal towards a display device.

Data can be transmitted regardless of its format, such as text, image, voice, etc., in the inter-terminal communication mode. Moreover, in the inter-terminal communication mode, data communication of maximum 424 kbps can be made between the NFC devices that are within 10 cm from each other. Furthermore, inter-terminal communication is made in the P2P communication method, unlike a server-client method.

Hereinafter, it will be described that information is transferred from the first terminal 100 to the second terminal 200 using short-range communication. The information can be transferred between the terminals 100, 200 using two types of short-range communication. For example, a first short-range communication can be carried out using an NFC device, and a second short-range communication can be carried out using a Bluetooth device.

The first terminal 100 and the second terminal 200 obtain tag information from each other's tag by performing reciprocal communication using the first short-range communication. Here, the obtained tag information includes connection information for connecting to the second communication. For example, the connection information can include address information, such as an address of the Bluetooth device.

Afterwards, the second terminal 200 can use the connection information to request to connect to the first terminal 100 using the second short-range communication so that the first terminal 100 and the second terminal 200 communicate with each other using the second short-range communication.

Moreover, the terminals 100, 200 calculate position information when the tag information is obtained and exchange the calculated position information with each other, and calculate intersection state information using the position information of the two terminals 100, 200. Accordingly, the first terminal 100 can extract information corresponding to the intersection state information and transfer the extracted information to the second terminal 200 using the second short-range communication.

For example, the position information can be a tilt angle of the terminals 100, 200 as they are approaching each other's tags. Hereinafter, it will be described that the position information is the tilt angle.

In case the two terminals 100, 200 approach each other and perform the first short-range communication, a tilt angle by which the two terminals 100, 200 are tilted with respect to each other as they approach each other can be measured and calculated. Here, the terminals 100, 200 can measure the tilt angle of the terminals 100, 200 using sensors installed therein.

Moreover, the position information can be generated by three-dimensionally measuring the tilt angle of the terminals 100, 200. For example, the terminals 100, 200 can generate the position information by measuring and combining a tilt angle of the terminals 100, 200 with respect to each other and a tilt angle of the terminals 100, 200 from the ground.

Moreover, the terminals 100, 200 can exchange the position information using the first or second short-range communication and calculate the intersection state information using each other's position information. For example, the intersection state information can be an intersecting angle between the terminals 100, 200. Hereinafter, it will be described that the intersection state information is the intersecting angle.

The intersecting angle between the terminals 100, 200 can be a difference between the tilt angles of the terminals 100, 200. Here, it shall be appreciated that the tilt angles are calculated by the terminals 100, 200 based on a same criterion.

Then, the first terminal 100 extracts information corresponding to the intersection state information and transmits the extracted information to the second terminal 200. For this, each of the terminals 100, 200 maps and stores information corresponding to predetermined intersection state information.

For example, the information transferred to the second terminal 200 from the first terminal 100 can be business card data, financial data, etc. In an exemplary embodiment, the financial data can be payment related information, including credit card data, bank account data, electronic money data, etc.

For example, if the information transferred from the first terminal 100 to the second terminal 200 is a plurality of business card data, the first terminal 100 can map and store each of the business card data with a respective intersecting angle. Moreover, if the transferred information is a plurality of financial data, the first terminal 100 can map and store each of the financial data with a respective intersecting angle. Accordingly, a user of the first terminal 100 can select and transfer a desired business card to the second terminal 200 and can make a payment by choosing a desired credit card or bank account. Here, the financial information can be stored in the terminals 100, 200 or in a server, such as in a server of a financial institution. In the case that the financial data is stored in the terminals 100, 200, the financial data can be stored in a highly secure storage medium, such as a USIM, and in the case that the financial data is stored in the server, information mapped to the financial data can be stored in the terminals 100, 200.

Figure 2:
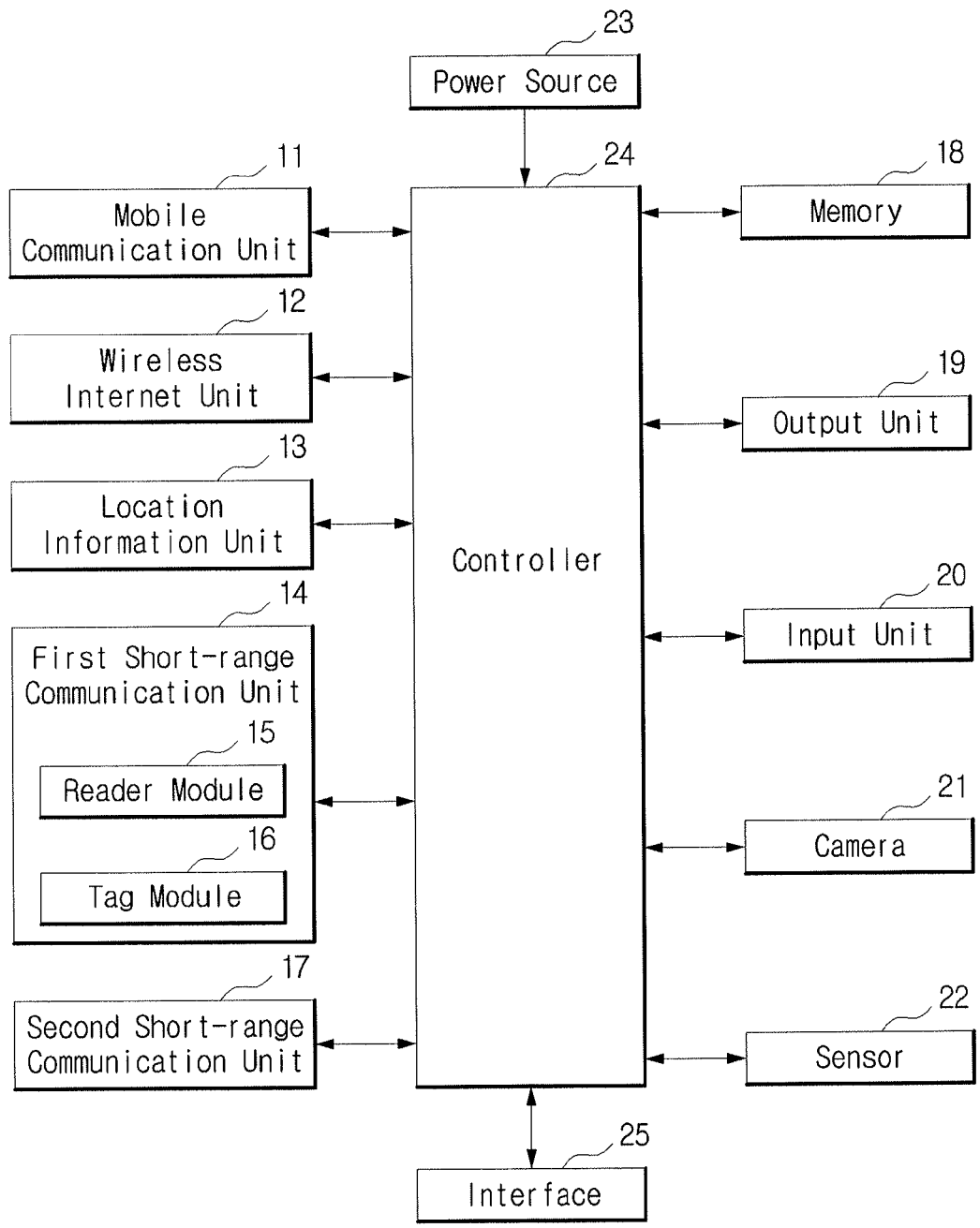
FIG. 2 is a view illustrating a configuration of a mobile communication terminal according to an exemplary embodiment.

FIG. 2 is a view illustrating a configuration of a mobile communication terminal according to an exemplary embodiment.

Hereinafter, an exemplary configuration of the mobile communication terminal (the first terminal 100 and the second terminal 200) will be described with reference to FIG. 2 according to an exemplary embodiment, but FIG. 3 and FIG. 4 will also be referenced.

Referring to FIG. 2, the mobile communication terminal includes a mobile communication unit 11, a wireless internet unit 12, a location information unit 13, a first short-range communication unit 14, a second short-range communication unit 17, a memory 18, an output unit 19, an input unit 20, a camera 21, a sensor 22, a power source 23, a controller 24, and an interface 25.

The mobile communication unit 11 carries out mobile communication between the mobile communication terminal and a mobile communication system. Specifically, the mobile communication unit 11 transmits and receives wireless signals with at least one of a base station, an external terminal, and a server on the mobile communication network. The wireless signals can include various types of data according to transmitting and receiving voice call signals, video call signals, text, or a multimedia message.

The wireless internet unit 12 carries out a function of accessing the wireless Internet. The wireless internet unit 12 can be installed internally or externally on the mobile communication terminal. Utilized for the wireless internet technology can be WLAN (Wireless LAN, Wi-Fi), Wibro (Wireless broadband), Wimax (World Interoperability for Microwave Access) and HSDPA (High Speed Downlink Packet Access).

The location information unit 13 carries out a function of checking or obtaining a location of the mobile communication terminal. A typical example of the location information unit 13 is a GPS (Global Positioning System) module. For example, the location information unit 13 can calculate three-dimensional location information based on latitude, longitude and altitude of a location (object) at a particular time by calculating distance information between the location and three or more satellites and information about the particular time when the distance information is calculated and then can apply trigonometry to the calculated distance information.

Moreover, the location information unit 13 can calculate the location and time information by using satellites e.g., three satellites and correct an error of the calculated location and time information by using another satellite. The location information unit 13 can also calculate speed information by continuously calculating current locations in real time.

The first short-range communication unit 14 can set a communication link with a tag or a first short-range communication unit installed in another terminal. For example, the first short-range communication unit 14 can be an NFC module. Here, the distance by which the communication link can be set up within 10 cm, in the case of NFC.

The first short-range communication unit 14 includes a reader module 15 and a tag module 16.

The reader module 15 can read tag information of a tag module installed in another terminal, using the configured communication link.

The tag module 16, which can include an antenna and an integrated circuit, can write the tag information in the integrated circuit and transmit the tag information to the reader module using the antenna. The tag module and the reader module can transmit and receive the tag information to and from each other using electric waves.

In this specification, the tag module 16 stores tag information including connection information for connecting with another terminal using the second short-range communication. Here, another terminal has a first short-range communication unit including a tag module and a reader module, and stores tag information including connection information for connecting to the tag module using the second short-range communication. Accordingly, the reader module 15 can obtain the tag information containing the connection information from the tag module of another terminal, and the tag module 16 can transmit the tag information containing the connection information to the reader module of another terminal. For example, the connection information can contain address information such as an address for a Bluetooth device.

The second short-range communication unit 17 sets a communication link with a second short-range communication unit installed in another terminal and sends and receives data, such as a file. For example, the second short-range communication unit 17 can be a Bluetooth module.

The second short-range communication unit 17 can set a communication link with the second short-range communication unit installed in the other terminal using the connection information obtained using the first short-range communication unit 14.

The memory 18 can store a program for operation of the controller 24 and can also store input/output data (e.g., phone book, message, still image, video, etc.). Particularly, the memory 18 maps and stores information corresponding to the intersection state information. For example, the memory 18 can store information for each intersecting angle, which can be business card data, financial data, etc. Here, the financial data can be payment related information, including credit card data, bank account data, electronic money data, etc. If there is a plurality of business card data, the memory 18 can map and store each of the business card data for a respective intersecting angle. Moreover, if there is a plurality of financial data, the memory 18 can map and store each of the financial data for a respective intersecting angle.

The memory 18 can also store various patterns of vibrations and sounds that are output when a touch screen is touched.

Moreover, the memory 18 can include at least one storage medium of a flash memory type, a hard disk type, a multimedia card micro type, a card type (e.g., SD or XD), Random Access Memory (RAM), SRAM (Static Random Access Memory), Read-Only Memory (ROM), EEPROM (Electrically Erasable Programmable Read-Only Memory), PROM (Programmable Read-Only Memory), a magnetic memory, a magnetic disk and an optical disk.

The output unit 19 generates an acoustic, visual and/or haptic output and can include a display module which displays the output on a screen of a device, an acoustic output module which provides an audio output to the user and/or a haptic module which provides a haptic effect to the user.

Specifically, the display module outputs and displays information processed by the mobile communication terminal. For example, the display module displays a UI (User Interface) or a GUI (Graphic User Interface) related to a telephone call, if the mobile communication terminal is in a telephone call mode. If the mobile communication terminal is in a video call mode or a camera mode, the display module can display a photographed and/or received image or the UI or GUI for the same.

Moreover, the display module can be realized as a liquid crystal display, a thin film transistor-liquid crystal display, an organic light-emitting diode, a flexible display, a 3D display and/or the like.

Depending on how the mobile communication terminal is realized, there can be more than one display module. For example, the mobile communication terminal can have a plurality of display modules arranged together or separately on one surface thereof or on different surfaces, respectively.

The acoustic output module can output audio data received from the mobile communication unit 11 or stored in the memory 18, in a call signal mode, a telephone call or recording mode, a voice recognition mode, a broadcasting reception mode and the like.

Moreover, the acoustic output module can output an audio signal related to a function (e.g., a call signal receiving alert, a message arriving alert, etc.) performed by the mobile communication terminal. Such an acoustic output module can include a receiver, a speaker, a buzzer and the like.

The haptic module generates various haptic effects that the user can sense. Vibration is a typical example of the haptic effect generated by the haptic module. The intensity and pattern of the vibration generated by the haptic module are controllable. For example, it is possible to output the vibration by combining different vibrations or output the different vibrations successively.

The input unit 20 is a user interface for having various commands input by the user and has no particular restriction on how it is realized. For example, the input unit 20 can be provided as one or more operation units of a key pad, a touch pad, a wheel key, a jog switch, and the like.

As the mobile communication terminal increasingly adopts a full touch type that utilizes a touch screen method, the input unit 20 can be realized in a soft-key method throughout an entire surface of a display screen by being combined with the display module of the output unit 19.

The camera 21 processes image frames, such as still images or video, which are obtained by an image sensor in the video call mode or the camera mode. The processed image frames can be displayed in the output unit 19.

The image frames processed by the camera 21 can be stored in the memory 18 or transmitted to an outside using one of the mobile communication unit 11, the wireless internet unit 12, the first short-range communication unit 14, and the second short-range communication unit 17. Moreover, there can be more than one camera 21, depending on the configuration of the mobile communication terminal.

The sensor 22 detects a current status of the mobile communication terminal, for example, an open/close state of the mobile communication terminal, a location of the mobile communication terminal, a contact status (touch input) of the user, an orientation of the mobile communication terminal, an acceleration/deceleration of the mobile communication terminal and the like, to generate a sensing signal for controlling an operation of the mobile communication terminal. For example, in the case that the mobile communication terminal is a slide, a swivel, or a flip phone, the sensor 22 can sense whether the phone is open or closed. Moreover, the sensor 22 can perform various sensing functions such as sensing power provided by the power source 23, coupling of the interface 25 with an external device, and the like.

The sensor 22 detects shaking of the mobile communication terminal and notifies when shaking is detected to the controller 24. Moreover, the sensor 22 can measure the tilt angle of the mobile communication terminal and provide the measured data to the controller 24. For example, if the mobile communication terminal is a gyro sensor, the sensor 22 can measure the tilt angle or a level of tiling of the mobile communication terminal using the gyro sensor. Moreover, the sensor 22 can measure the tilt angle using one or more of an acceleration sensor, a gravity sensor, a compass sensor and the like, instead of the gyro sensor. For example, the sensor 22 can use the acceleration sensor or the gravity sensor to measure the tilt angle with respect to the ground or use the compass sensor to measure an azimuth angle.

For example, the tilt angle can be measured as an angle between 0 and 360 degrees. Moreover, the tilt angle can be measured as an azimuth angle between 0 and 360 degrees. The tilt angle can be measured as a combination of the tilt angle and the azimuth angle.

The sensor 22 can measure the tilt angle of the mobile communication terminal when the communication link is generated between the first terminal 100 and the second terminal 200. Here, the sensor 22 can start measuring the tilt angle when instructed by the controller 24 i.e., at a time when the sensor 22 measures the tilt angle.

The power source 23 is provided with external power and/or internal power by a control of the controller 24 and supplies power that is required for operation of each of the elements.

The controller 24 generally controls overall operations of the mobile communication terminal. For example, the controller 24 handles controls and processes related to voice call, video call, data communication and the like. Moreover, the controller 24 can encompass a multimedia module for multimedia playback.

The controller 24 can control the second short-range communication unit 17 so that the second short-range communication is connected with another terminal using the connection information obtained using the first short-range communication unit 14.

The controller 24 can perform one or more calculations using measurement data of the mobile communication terminal that is provided by the sensor 22 and generate the tilt angle based on this calculation. Here, the controller 24 controls the sensor 22 to measure the tilt angle of the mobile communication terminal when the tag information is obtained from the tag module of another terminal. Once the tilt angle is calculated, the controller 24 can control the first short-range communication unit 14 or the second short-range communication unit 17 to exchange the tilt angle with another terminal using the first short-range communication unit 14 or the second short-range communication unit 17.

Moreover, the controller 24 can calculate the intersecting angle between the terminals 100, 200 using the calculated tilt angle and a tile angle of another terminal. Here, the intersecting angle between the terminals 100, 200 can be a difference between the calculated tilt angle and the tilt angle of the other terminal.

Figure 3:
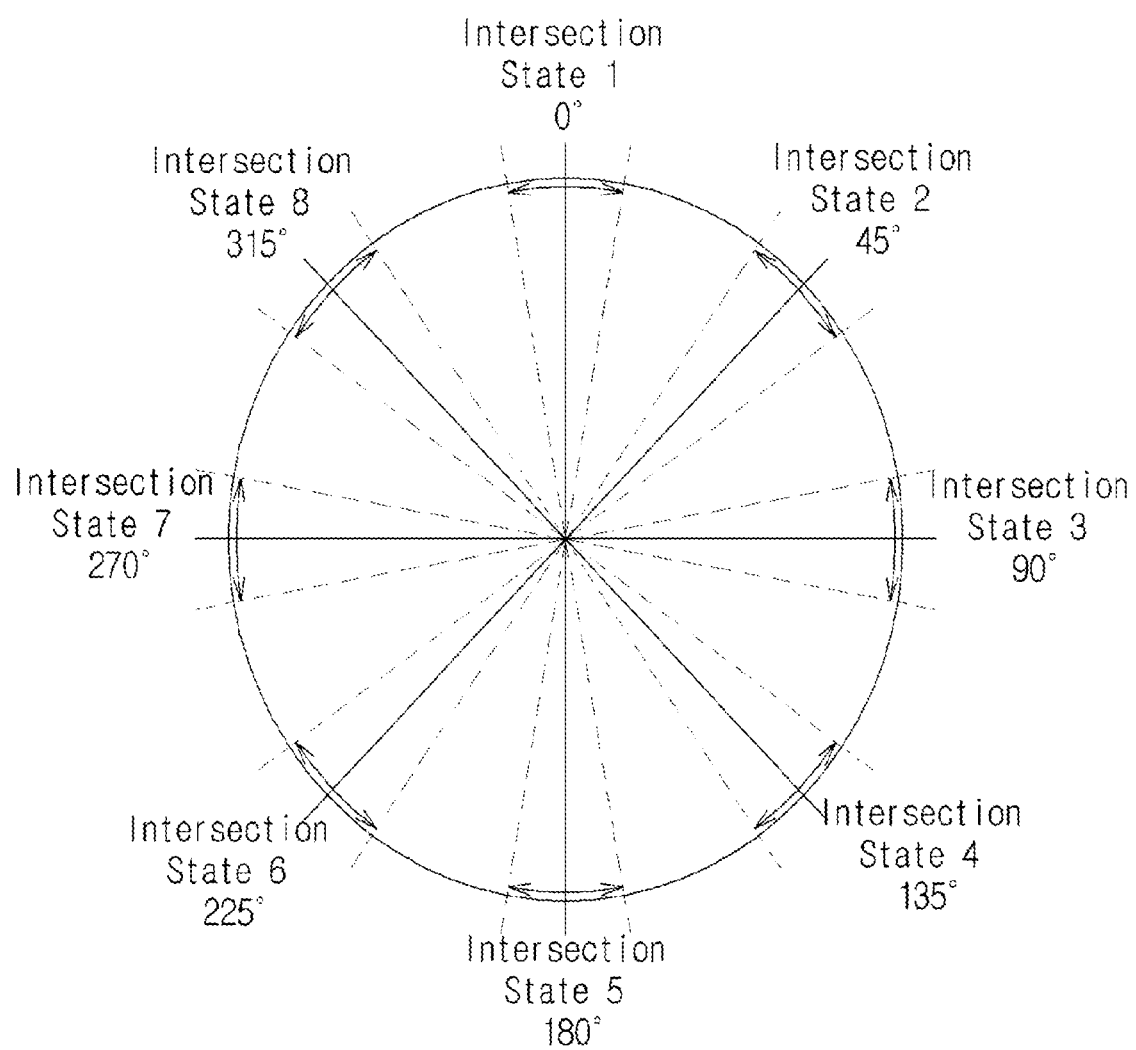
FIG. 3 is a view illustrating intersection states according to intersecting angles according to an exemplary embodiment.

For example, FIG. 3 is a view illustrating intersection states based on intersecting angles between the two terminals. Referring to FIG. 3, the intersection states between the terminals 100, 200 can be expressed in 8 different intersecting angles, in which 360 degrees are divided into 8 sections. That is, the intersection state is expressed as a section, in which 360 degrees are separated by 45 degrees, and each section can have a predetermined range.

Figure 4:
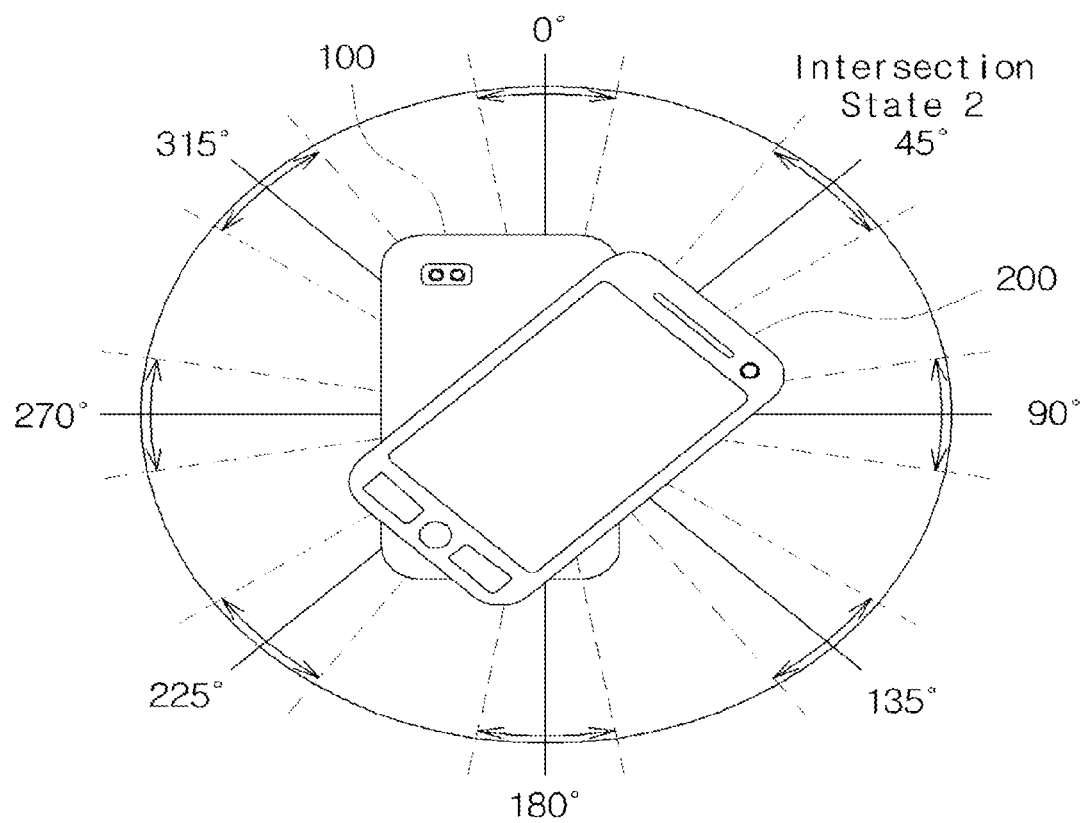
FIG. 4 is a view illustrating an intersection state between two mobile communication terminals according to an exemplary embodiment.

For example, FIG. 4 is a view illustrating an intersection state between two mobile communication terminals according to an exemplary embodiment. As illustrated in FIG. 4, if the tilt angle of the first terminal 100 is 0 degree and the tilt angle of the second terminal 200 is calculated to be 45 degrees, the intersecting angle between the terminals 100, 200 is calculated to be 45 degrees and the intersection state of the mobile communication terminal 100 becomes "Intersection State 2."

The controller 24 can extract information corresponding to the calculated intersecting angle and can control the second short-range communication unit 17 to transfer the extracted information to another terminal.

For example, if the memory 18 stores the business card data for a respective intersecting angle, the controller 24 can extract the business card data corresponding to the intersecting angle and control the second short-range communication unit 17 to transfer the extracted business card data to another terminal.

The interface 25 provides a path to all external devices that are connected with the mobile communication terminal. Data is transmitted from the external device and/or power is supplied to the interface 25 in such a way that the data and/or the power is transferred to each element inside the mobile communication terminal or that data inside the mobile communication terminal is transmitted to the external device. For example, included in the interface 25 can be a wired/wireless headset port, an external charger port, a wired/wireless data port, a memory card port, a port connecting a device having an identification module, an audio I/O (input/output) port, a video I/O port, an earphone port and the like.

FIG. 5 is a flow diagram illustrating a method of transferring information according to an exemplary embodiment.

In operation S510, the first terminal 100 and the second terminal 200 contact each other or are provided within a predetermined distance from each other in which the first mobile communication terminal can read information of another mobile communication terminal. Here, the user of each of the terminals 100, 200 can bring the first terminal 100 to touch the second terminal 200 at a predetermined intersecting angle. This is only one example, and the first terminal 100 and the second terminal 200 can perform the first short-range communication when the first terminal 100 and the second terminal 200 are positioned within a communicable distance from each other so as to perform the short-range communication. The first short-range communication can be, for example, NFC.

In operation S520, the first terminal 100 and the second terminal 200 obtain the tag information from each other's tag by performing reciprocal communication using the first short-range communication. Here, the obtained tag information includes the connection information for connecting the terminals using the second short-range communication. For example, the second short-range communication can be Bluetooth, and the connection information can include address information, such as an address for a Bluetooth device.

In operation S530, the first terminal 100 and the second terminal 200 use the connection information to communicate with each other using the second short-range communication.

In operation S540, the first terminal 100 and the second terminal 200 calculate the position information. Here, the position information can be the tilt angle of each of the terminals 100, 200 as they are approaching each other's tags.

In operation S550, the first terminal 100 and the second terminal 200 exchange the calculated position information using the first or second short-range communication.

In operation S560, the first terminal 100 and the second terminal 200 calculate the intersection state information using each other's position information. Here, the intersection state information can be the intersecting angle between the terminals 100, 200, and the intersecting angle between the terminals 100, 200 can be a difference between the tilt angles of the terminals 100, 200.

In operation S570, the first terminal 100 extracts information corresponding to the intersection state information. Each of the terminals 100, 200 is mapped and stores information corresponding to predetermined intersection state information therein.

In operation S580, the first terminal 100 transmits the extracted information to the second terminal 200 using the second short-range communication.

The method for providing information in accordance with an exemplary embodiment can be embodied in the form of program instructions, which can be performed through various electronic data processing means, and can be written in a storage medium, which can include program instructions, data files, data structures and the combination thereof.

The program instructions stored in the storage medium can be designed and configured specifically for exemplary embodiments or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules to perform the operation of exemplary embodiments, and the opposite is also possible.

Although exemplary embodiments of the present invention have been described above, it shall be appreciated that there can be a variety of changes and modifications apparent to those who are ordinarily skilled in the art to which the present invention pertains without departing from the technical ideas and scope of an inventive concept, which shall be defined by the appended claims.

What is claimed is:

1. A system for transferring information between terminals comprising:
    a first terminal configured to extract transfer information and configured to transmit the transfer information; and
    a second terminal configured to receive the transfer information,
    wherein the transfer information is extracted by the first terminal based on one of a plurality of intersection states between the first terminal and the second terminal when the first terminal communicates using first short-range communication with the second terminal, and
    wherein the first terminal and the second terminal, each calculate respective position information when the first terminal communicates with the second terminal using the first short-range communication, exchange the calculated position information with each other, and calculate the one of the plurality of intersection states based on the respective position information,
    the position information is a tilt angle measured by a sensor as the first terminal and the second terminal approach each other,
    wherein the first terminal and the second terminal are further configured to transfer respective information, with respect to calculations of ones of the plurality of intersection states, as the first terminal and the second terminal approach each other.

2. The system of claim 1, wherein: the one of the plurality of intersection states is a difference between the tilt angle of the first terminal and the tilt angle of the second terminal, and
    the first terminal and the second terminal are further configured to calculate the respective position information as the first terminal and the second terminal approach each other without shaking of the first and second terminals.

3. The system of claim 1, wherein each of the first terminal and the second terminal is configured to store a plurality of transfer information and map each of the stored transfer information to a respective intersection state.

4. The system of claim 1, wherein the first terminal and the second terminal are configured to obtain tag information from each other using the first short-range communication and configured to connect to each other using second short-range communication based on the obtained tag information which comprises connection information for the second short-range communication.

5. The system of claim 4, wherein the first terminal is configured to transmit the transfer information to the second terminal using the second short-range communication.

6. The system of claim 4, wherein the first short-range communication is Near Field Communication, and wherein the second short-range communication is one of Bluetooth, ZigBee, Radio Frequency Identification, and infrared communication.

7. The system of claim 4, wherein the first terminal and the second terminal are configured to exchange the position information with each other using at least one of the first short-range communication and the second short-range communication.

8. The system of claim 1, wherein the transfer information is one of business card data and payment related information, and
    wherein the payment related information comprises at least one of credit card data, bank account data, and electronic money data.

9. A mobile communication terminal configured to transmit transfer information to another terminal using short-range communication, comprising:
    a first short-range communication unit configured to transmit and receive tag information to and from said another terminal;
    a sensor configured to detect position information of the mobile communication terminal when the tag information is transmitted and received;
    a memory configured to map and store the transfer information that corresponds to one of a plurality of intersection states of the mobile communication terminal with said another terminal; and
    a controller configured to exchange position information of said another terminal and the detected position information of the mobile communication terminal with said another terminal using the first short-range communication unit, configured to calculate the one of the plurality of intersection states based on the position information of said another terminal and the detected position information, and configured to extract from the memory, the transfer information corresponding to the one of the plurality of intersection states and configured to transmit the transfer information to said another terminal,
    wherein the position information is a tilt angle measured by the sensor installed in the mobile communication terminal and by another sensor in said another terminal, as the mobile communication terminal and said another terminal approach each other, and
    wherein said another terminal and the mobile communication terminal are further configured to transfer respective information, with respect to calculations of ones of the plurality of intersection states, as the another terminal and the mobile communication terminal approach each other.

10. The mobile communication terminal of claim 9, wherein the one of the plurality of intersection states is a difference between the tilt angle of the mobile communication terminal and the tilt angle of said another terminal.

11. The mobile communication terminal of claim 9, further comprising a second short-range communication unit configured to connect the mobile communication terminal to said another communication terminal using second short-range communication based on connection information provided in the tag information.

12. The mobile communication terminal of claim 11, wherein the controller is configured to control the mobile communication terminal to transmit the transfer information to said another terminal using the second short-range communication unit.

13. The mobile communication terminal of claim 11, wherein the controller is configured to control the mobile communication terminal to exchange the position information with said another terminal using the second short-range communication unit.

14. A method of transferring information between terminals comprising:
    connecting a first terminal with a second terminal using first short-range communication;
    transmitting from the first terminal to the second terminal tag information;
    calculating, by the first terminal and the second terminal, position information;
    exchanging among the terminals the position information;
    calculating, by the first terminal, one of a plurality of intersection states of the first terminal with respect to the second terminal based on the position information of the first terminal and the position information of the second terminal;
    extracting, by the first terminal, transfer information based on the one of the plurality of intersection states; and
    transmitting, by the first terminal, the extracted transfer information to the second terminal,
    wherein the position information is a tilt angle measured by a sensor a respective terminal from among the first terminal and the second terminal, as the first terminal and the second terminal approach each other, and
    wherein the first terminal and the second terminal are further configured to transfer respective information, with respect to calculations of ones of the plurality of intersection states, as the first terminal and the second terminal approach each other.

15. The method of claim 14, wherein the one of the plurality of intersection states is a difference between the tilt angle of the first terminal and the tilt angle of the second terminal.

16. The method of claim 14, further comprising storing, by the first terminal, a plurality of transfer information and mapping, by the first terminal, each of the stored transfer information to a respective intersection state.

17. The method of claim 14, further comprising, after the transmitting the tag information, connecting the first terminal and the second terminal using the second short-range communication based on connection information provided in the tag information.

18. The method of claim 17, wherein the extracting the transfer information and transmitting the transfer information to the second terminal comprises transmitting, by the first terminal, the transfer information to the second terminal using the second short-range communication.

19. The method of claim 17, wherein the exchanging, by the first terminal and the second terminal, the position information is performed using one of the first short-range communication and the second short-range communication.

20. The system of claim 1, wherein each of the first terminal and the second terminal comprise a respective tag and a reader and wherein the respective position information is calculated based on the reader of the first terminal reading the tag of the second terminal and the reader of the second terminal reading the tag of the first terminal.

21. The system of claim 20, wherein the first terminal is configured to calculate the one of the plurality of intersection states based on a difference between the calculated position of the first terminal and the calculated position of the second terminal, and is configured to classify the one of the plurality of intersection states in one of a plurality of angle ranges, and
    wherein different transfer information is provided from the first terminal to the second terminal based on the classification into different angle ranges and based on time of detecting the respective tag of another terminal.

22. The system of claim 1, wherein the tilt angle is a three-dimensional measurement combining a tilt angle of the first terminal and the second terminal with respect to each other and a tilt angle of the first terminal and the second terminal from a surface of the earth.

\* \* \* \* \*